United States Patent
Park et al.

(10) Patent No.: US 11,347,786 B2
(45) Date of Patent: May 31, 2022

(54) IMAGE SEARCH SYSTEM AND METHOD USING DESCRIPTIONS AND ATTRIBUTES OF SKETCH QUERIES

(71) Applicant: HANWHA TECHWIN CO., LTD., Seongnam-si (KR)

(72) Inventors: DongJun Park, Changwon-si (KR); YeonGeol Ryu, Changwon-si (KR); HakChul Shin, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 560 days.

(21) Appl. No.: 15/033,757

(22) PCT Filed: Sep. 26, 2014

(86) PCT No.: PCT/KR2014/009013
§ 371 (c)(1),
(2) Date: May 2, 2016

(87) PCT Pub. No.: WO2015/080371
PCT Pub. Date: Jun. 4, 2015

(65) Prior Publication Data
US 2016/0239521 A1 Aug. 18, 2016

(30) Foreign Application Priority Data
Nov. 27, 2013 (KR) .................... 10-2013-0145460

(51) Int. Cl.
*G06F 16/532* (2019.01)
*G06F 16/951* (2019.01)

(52) U.S. Cl.
CPC .......... *G06F 16/532* (2019.01); *G06F 16/951* (2019.01)

(58) Field of Classification Search
CPC ......... G06F 17/30277; G06F 17/30864; G06F 16/951; G06F 16/532
(Continued)

(56) References Cited

U.S. PATENT DOCUMENTS 5,493,677 A * 2/1996 Balogh .................. G06Q 30/04
382/305
5,579,471 A * 11/1996 Barber ................. G06K 9/4647
715/700
(Continued)

FOREIGN PATENT DOCUMENTS

JP 200639847 A 2/2006
KR 2001-0041607 A 5/2001
(Continued)

OTHER PUBLICATIONS

Communications (PCT/ISA/210, 220, and 237) dated Dec. 30, 2014, issued by the International Searching Authority in counterpart International Application No. PCT/KR2014/009013.
(Continued)

*Primary Examiner* — Ashish Thomas
*Assistant Examiner* — Nargis Sultana
(74) *Attorney, Agent, or Firm* — Sughrue Mion, PLLC (57) ABSTRACT

Provided are image search system and methods. The image search system may include a query engine for reconfiguring a search query based on a description and an attribute of a sketch query that is input to a query image; a search engine for extracting image data that matches the search query from a database; and a display apparatus for displaying the extracted image data.

10 Claims, 7 Drawing Sheets

(58) Field of Classification Search
USPC .......................................................... 707/706
See application file for complete search history.

(56) References Cited

U.S. PATENT DOCUMENTS

| | | | | |
|---|---|---|---|---|
| 5,708,805 A * | 1/1998 | Okamoto | ................ | G06F 16/58 |
| 5,724,484 A * | 3/1998 | Kagami | ................ | G06Q 30/02 |
| | | | | 706/50 |
| 5,911,139 A * | 6/1999 | Jain | ................ | G06F 16/5838 |
| 5,930,783 A * | 7/1999 | Li | ................ | G06F 16/58 |
| 6,269,358 B1 * | 7/2001 | Hirata | ................ | G06F 16/5846 |
| 6,345,271 B1 * | 2/2002 | Dempsey | ................ | G06F 16/24535 |
| | | | | 707/999.005 |
| 6,741,655 B1 * | 5/2004 | Chang | ................ | G06F 16/7854 |
| | | | | 707/E17.02 |
| 6,813,385 B2 * | 11/2004 | Ideyama | ................ | G06T 1/0028 |
| | | | | 358/1.14 |
| 6,813,395 B1 * | 11/2004 | Kinjo | ................ | G06V 10/44 |
| | | | | 382/282 |
| 6,976,229 B1 * | 12/2005 | Balabanovic | ................ | G11B 27/031 |
| | | | | 715/838 |
| 7,610,274 B2 * | 10/2009 | Gotoh | ................ | G06F 16/58 |
| 8,208,169 B2 * | 6/2012 | Clark | ................ | G06K 15/1852 |
| | | | | 358/1.9 |
| 8,558,872 B1 * | 10/2013 | Cho | ................ | G06T 11/00 |
| | | | | 348/43 |
| 8,718,369 B1 * | 5/2014 | Tompkins | ................ | G06F 16/532 |
| | | | | 382/181 |
| 9,330,446 B2 * | 5/2016 | Park | ................ | G06T 5/003 |
| 2001/0041607 A1 * | 11/2001 | Adamczyk | ................ | A63F 13/06 |
| | | | | 463/2 |
| 2002/0168117 A1 * | 11/2002 | Lee | ................ | G06F 16/5838 |
| | | | | 382/305 |
| 2003/0198380 A1 * | 10/2003 | Shin | ................ | G06F 16/5838 |
| | | | | 382/165 |
| 2005/0268220 A1 * | 12/2005 | Tanaka | ................ | G06F 40/169 |
| | | | | 715/230 |
| 2007/0071323 A1 * | 3/2007 | Kontsevich | ................ | G06F 16/7847 |
| | | | | 707/E17.02 |
| 2008/0316311 A1 * | 12/2008 | Albers | ................ | G06F 16/7837 |
| | | | | 348/143 |
| 2009/0070321 A1 * | 3/2009 | Apartsin | ................ | G06F 16/9032 |
| 2009/0316311 A1 * | 12/2009 | Hara | ................ | H02M 3/156 |
| | | | | 361/18 |
| 2010/0218228 A1 * | 8/2010 | Walter | ................ | G06V 20/46 |
| | | | | 725/105 |
| 2011/0246439 A1 * | 10/2011 | Isard | ................ | G06F 16/951 |
| | | | | 707/706 |
| 2012/0054177 A1 * | 3/2012 | Wang | ................ | G06V 30/32 |
| | | | | 707/723 |
| 2012/0158784 A1 * | 6/2012 | Bluvband | ................ | G06F 16/532 |
| | | | | 707/E17.03 |
| 2013/0097181 A1 * | 4/2013 | Sud | ................ | G06F 16/532 |
| | | | | 707/748 |
| 2013/0311450 A1 * | 11/2013 | Ramani | ................ | G06F 16/248 |
| | | | | 707/722 |
| 2014/0006446 A1 * | 1/2014 | Carter | ................ | G06F 16/532 |
| | | | | 707/772 |
| 2014/0074888 A1 * | 3/2014 | Potter | ................ | G06F 16/2423 |
| | | | | 707/779 |
| 2014/0104432 A1 * | 4/2014 | Lee | ................ | H04N 5/332 |
| | | | | 348/159 |
| 2014/0169677 A1 * | 6/2014 | Wu | ................ | G06K 9/00456 |
| | | | | 382/190 |
| 2014/0313216 A1 * | 10/2014 | Steingrimsson | ... | G06K 9/00402 |
| | | | | 345/589 |
| 2015/0294185 A1 * | 10/2015 | Cady | ................ | G06F 16/51 |
| | | | | 382/195 |
| 2016/0132498 A1 * | 5/2016 | Wang | ................ | G06F 16/24578 |
| | | | | 382/165 |
| 2019/0163768 A1 * | 5/2019 | Gulati | ................ | G06F 16/9535 |

FOREIGN PATENT DOCUMENTS

KR  1020130059040 A  6/2013
WO  99/45483 A1  9/1999

OTHER PUBLICATIONS

Communication dated Feb. 20, 2018 issued by the Korean Patent Office in counterpart Application No. 10-2013-0145460.

* cited by examiner

IMAGE SEARCH SYSTEM AND METHOD USING DESCRIPTIONS AND ATTRIBUTES OF SKETCH QUERIES

RELATED APPLICATIONS

This application is a Continuation of PCT International Application No. PCT/KR2014/009013, filed Sep. 26, 2014, and claims the benefit of Korean Patent Application No. 10-2013-0145460, filed on Nov. 27, 2013, in the Korean Intellectual Property Office, the disclosure of which is incorporated herein in its entirety by reference.

BACKGROUND

1. Field

One or more embodiments of the present invention relate to an image search system and method.

2. Description of the Related Art

As demand for multimedia services such as images or videos has considerably increased and portable multimedia apparatuses have been widely supplied, there is an increasing need for an efficient multimedia search system for managing a vast amount of multimedia data and quickly and accurately finding and providing content desired by a consumer.

Since it is difficult to represent an image that contains only visual information by using text, a text-based search may not fully satisfy a user's demand.

SUMMARY

One or more embodiments of the present invention include a search system and method that allow a user to conveniently perform an image search.

Additional aspects will be set forth in part in the description which follows and, in part, will be apparent from the description, or may be learned by practice of the presented embodiments.

According to one or more embodiments of the present invention, an image search system includes: a query engine for reconfiguring a search query based on a description and an attribute of a sketch query that is input to a query image; a search engine for extracting image data that matches the search query from a database; and a display apparatus for displaying the extracted image data.

According to whether colors of a plurality of sketch queries are identical to each other, the query engine may perform a logical operation on the plurality of sketch queries.

The query engine may reconfigure a search query by performing an AND logical operation on sketch queries of a same color, and may reconfigure a search query by performing an OR logical operation on sketch queries of different colors.

A sketch query expressed as a circle may refer to a category or an attribute of an object encompassed by the circle, according to a type of the circle.

A sketch query expressed as a triangle may refer to detection of an object that crosses a bottom side of the triangle and moves toward a vertex of the triangle.

A sketch query expressed as an arrow may refer to a direction of a motion of a single object or a plurality of objects, according to a size of the arrow.

A sketch query expressed as a line may refer to a moving line of a single object or a plurality of objects, according to a thickness of the line.

A sketch query expressed as a rectangle or a polygon may refer to a motion of a single object or an interaction between a plurality of objects in an area in which the rectangle or a polygon is located.

A sketch query expressed as an arbitrary shape may refer to an attribute of an object encompassed by the arbitrary shape, according to a type of the line in the arbitrary shape.

The image search system may further include a sketch input unit for providing an input tool via which the sketch query is input.

If a specific sketch query is selected by the input tool and a specific area in which the sketch query is to be located is selected from the query image, the sketch input unit may control a size of a sketch query that is input to the query image, according to a time for remaining the specific sketch query at the specific area selected.

According to one or more embodiments of the present invention, an image search method includes extracting a sketch query that is input to a query image; reconfiguring a search query based on a description and an attribute of the sketch query; extracting image data that matches the search query from a database; and displaying the extracted image data.

According to whether colors of a plurality of sketch queries are identical to each other, the reconfiguring of the search query may include performing a logical operation on the plurality of sketch queries.

The reconfiguring of the search query may include the reconfiguring of the search query by performing an AND logical operation on sketch queries of a same color, and may include the reconfiguring of the search query by performing an OR logical operation on sketch queries of different colors.

A sketch query expressed as a circle may refer to a category or an attribute of an object encompassed by the circle, according to a type of the circle.

A sketch query expressed as a triangle may refer to detection of an object that crosses a bottom side of a triangle and moves toward a vertex.

The image search system may further include providing an input tool via which the sketch query is input.

If a specific sketch query is selected by the input tool and a specific area in which the sketch query is to be located is selected from the query image, a size of a sketch query that is input to the query image may be controlled, according to a time for remaining the specific sketch query at the specific area selected.

BRIEF DESCRIPTION OF THE DRAWINGS

These and/or other aspects will become apparent and more readily appreciated from the following description of the embodiments, taken in conjunction with the accompanying drawings in which:

FIGS. 4 through 6B are diagrams illustrating an example of a sketch query according to an embodiment of the present invention;

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the invention allows for various changes and numerous embodiments, particular embodiments will be illustrated in the drawings and described in detail in the written description. However, this is not intended to limit the embodiments of the present invention to particular modes of practice, and it is to be appreciated that all changes, equivalents, and substitutes that do not depart from the spirit and technical scope of embodiments of the present invention are encompassed by the embodiments of the present invention. In the description of the embodiments of the present invention, certain detailed explanations of the related art are omitted when it is deemed that they may unnecessarily obscure the essence of the embodiments of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit embodiments of the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The embodiments of the present invention may be described in terms of functional block components and various processing steps. Such functional blocks may be realized by any number of hardware and/or software components configured to perform the specified functions. For example, the embodiments of the present invention may employ various integrated circuit components, e.g., memory elements, processing elements, logic elements, look-up tables, and the like, which may carry out a variety of functions under the control of one or more microprocessors or other control devices. Similarly, where the elements of embodiments of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the present invention could employ any number of conventional techniques for electronics configuration, signal processing and/or control, data processing and the like. The terms "mechanism" and "element" are used broadly and are not limited to mechanical or physical embodiments, but can include software routines in conjunction with processors, etc.

Figure 1:
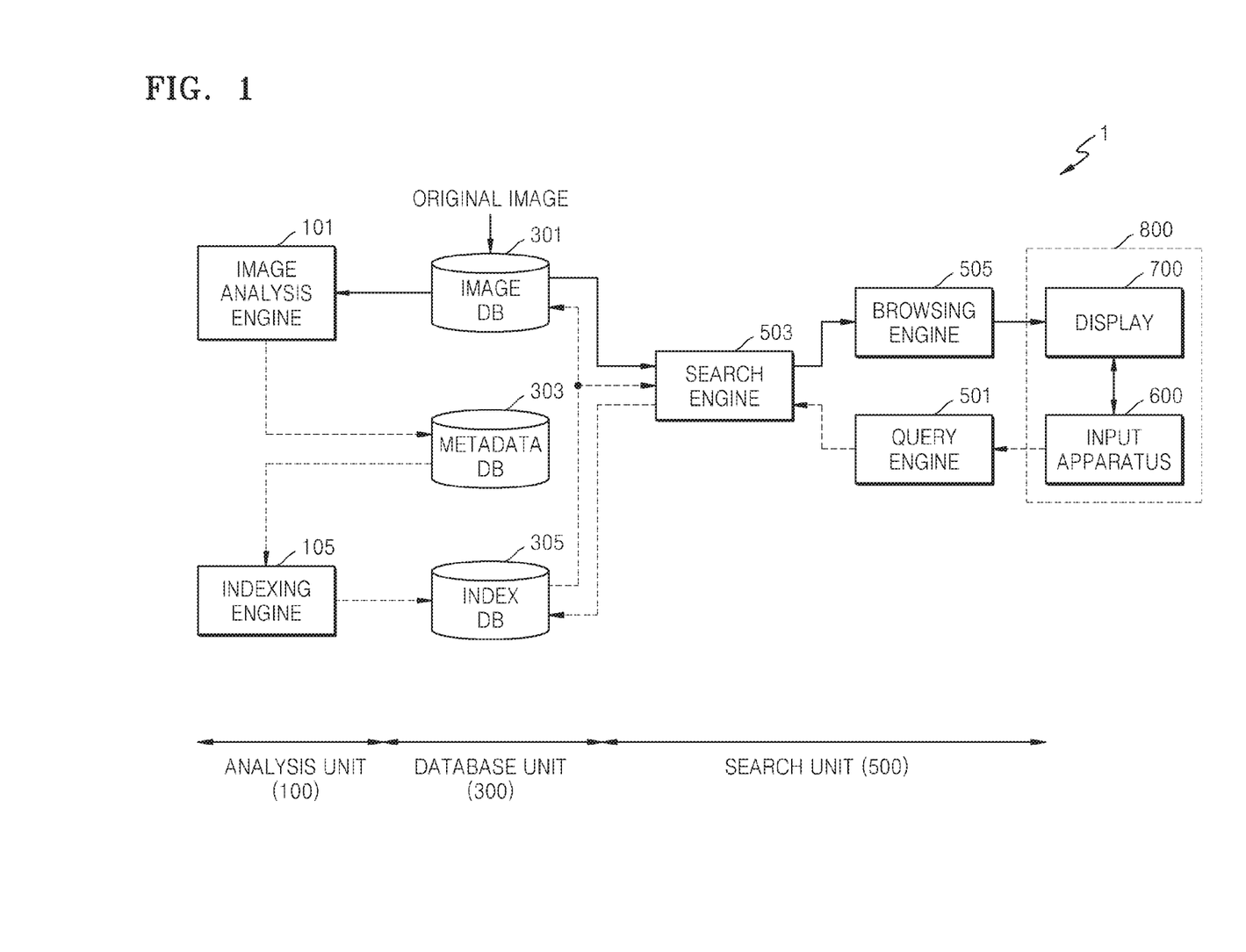
FIG. 1 is a block diagram illustrating a configuration of an image search system according to an embodiment of the present invention.

FIG. 1 is a block diagram illustrating a configuration of an image search system 1 according to an embodiment of the present invention. Referring to FIG. 1, the image search system 1 includes an analysis unit 100, a database unit 300, and a search unit 500.

The analysis unit 100 analyzes an input image based on ontology, and stores a result of the analyzing in the form of metadata. The analysis unit 100 may include an image analysis engine 101 and an indexing engine 105.

The image analysis engine 101 analyzes an image, classifies an image according to a predefined category, and extracts an attribute of an object that is detected from an image, for example, a type (species), a color, a size, a shape, a motion, a trajectory, or the like. A category may be a search condition that a user inputs so as to obtain a result. A relation and a meaning are defined for each category. A relation may be defined in consideration of a correlation between each category after a user's need for a search is analyzed.

The image analysis engine 101 may perform an image analysis such as object appearing, object disappearing, detection of motion of an object, an image turn-off. Additionally, the image analysis engine 101 may perform detection of a background area, detection of a foreground and an object, object counting, camera tempering detection, face detection, or the like. Additionally, the image analysis engine 101 may calculate information about brightness, color, texture, and a shape of an image.

Additionally, the image analysis engine 101 performs image analysis and, if a result of the image analysis meets a predefined condition for generating an event, generates an event. An event may include a system event that is set in a system, such as an event in which, if a network error occurs, a new camera (not illustrated) is set. In the case of an input image, an event may also include a user event that is set by a user, such as an object appearing, occurrence of an image specified by a user, for example, appearing of a face that may not be recognized, a change of a screen color, or generation of a motion in a set area. In the case of a sound source, an event may also include an abnormal sound source, for example, a friction sound caused by a vehicle tire (skidding), a glass breaking sound, an alarm sound, a crashing sound, or the like, a sound source specified by a user, for example, yelling, screaming, crying, or the like, or generation of a sound with a level equal to or greater than a threshold.

A result of the image analysis is stored in a metadata database 303 in the form of metadata. Image-based metadata such as a blob image of a motion area or a background model may be stored together with text-based metadata in the metadata database 303. A background model may be used as a query image to which a sketch is to be input.

The indexing engine 105 structures and arranges metadata and also stores the metadata in the index database 305 so that search is easily performed.

The search unit 500 extracts image data, which includes information that matches a search condition input that is by a user, from an image database 301 in the database unit 300 and provides the image data. The search unit 500 may include a query engine 300, a search engine 503, and a browsing engine 505.

The query engine 501 receives an input of a search condition from a user via an input apparatus 600, analyzes a request from a user based on the search condition, and restructures the request in a predefined form. For example, a user may input a time zone, a number of camera channels, a type of an object such as a human or a vehicle, a specific zone on a screen such as a region of interest (ROI), a specific line and a specific direction on a screen, or the like as a search condition via the input apparatus 600.

Additionally, the query engine 501 may provide a sketch input tool for inputting a sketch query that includes one or more simple and intuitive figures or symbols such as a line, a rectangle, or a circle to a query image. A user may input a sketch query to a query image as a search condition via the provided sketch input tool by using the input apparatus 600. A figure or symbol that constitutes a sketch query functions as a search word. Each sketch query is provided with a description and an attribute, so that a search condition may be extended. The query engine 501 may reconfigure a search query, based on the description and the attribute of the sketch query, which are input to the query image.

According to an embodiment of the present invention, an image search performed by using a sketch query enables to obtain semantics information by classifying an image, perform a fast search by reducing a search space during search, and actively express an image desired by a user through a sketch query.

The search engine 503 searches for necessary information by accessing a pre-stored database according to a search condition. The search engine 503 extracts index data that matches or is similar to a search query from the index database 305, and then, extracts image data that corresponds to the extracted index data from the image database 301. The search engine 503 may extract one or more pieces of image data which match a search query by performing a content-based image search by using the search query.

Based on a result of the search, that is, the extracted index data and image data, the browsing engine 505 may generate a resultant image in a predefined form and render the resultant image to a display apparatus 700 in real time. The browsing engine 505 may display time information such as a time of object appearing, a time of event generation, or the like on the resultant image. The browsing engine 505 may render a background model and one or more moving objects that correspond to the result of the search so that the one or more moving objects overlap with the background model. Additionally, the browsing engine 505 may provide a list of one or more resultant images that match the search query and may render a resultant image that is selected from among the list of the results images in real time.

The resultant image may be a video summary. A video summary is obtained by abstracting an image to have a short length. In other words, a video summary is obtained by configuring an image to have a shorter playback length than a playback length of an original image. If a search result consists of several image segments, a user may have to play respective image segments to grasp content of the original image. Such playback of respective image segments is inconvenient to a user and may take a lot of time. On the contrary, in the case of a video summary, a search result is entirely abstracted into one image, and then, the image is played. As such, a video summary may provide a function by which a user may conveniently grasp content of an image.

The database unit 300 stores an input image and a result of image analysis. The database unit 300 may include an image database 301, a metadata database 303, and the index database 305.

An input image may be an image that is directly transmitted from a camera (not illustrated), which is an image sensor connected to the image search system 1, or an image that is stored in a digital video recorder (DVR) or a network video recorder (NVR) which is connected to the image search system 1, or an image that is input through various paths via a network (not illustrated).

The image input to the image search system 1 is stored in the image database 301.

A result of image analysis is stored in the metadata database 303 in the form of text-based metadata. Additionally, image-based metadata that is a part of an image, for example, a blob image of an object whose motion is detected and a background model may be stored in the metadata database 303.

A user terminal 800 is a terminal used by a user or a security personnel who manages the image search system 1. The user terminal 800 may be a personal computer (PC) or a mobile terminal. The user may control the image search system 1 via the user terminal 800. The user terminal 800 includes the input apparatus 600 that is a user interface via which a query (a search condition) may be input to the image search system 1.

The input apparatus 600 is wired or wirelessly connected to the image search system 1 and generates input data so that a user may control an operation of the image search system 1. The input apparatus 600 may include a key pad, a dome switch, a touch pad, which may be of a capacitive overlay type, a resistive overlay type, an infrared beam type, a surface acoustic wave type, an integral strain gauge type, or a piezo electric type, a mouse, remote controller, a jog wheel, or a jog switch. The user terminal 800 may set a condition of displaying a resultant image, by editing, adding, or deleting a search condition using the input apparatus 600. The user may input a sketch query to a query image via a sketch input tool provided by using the input apparatus 600.

The user terminal 800 may display a resultant image which matches a search query that is obtained by reconfiguring the sketch query on the display apparatus 700.

The display apparatus 700 provides a resultant image that is output from the browsing engine 505 to a user, so that the user may monitor a displayed image. Additionally, the display apparatus 700 may display a query image and a sketch input tool for inputting, editing, adding, or deleting a sketch query. The display apparatus 700 may provide visual information and/or audio information to a user. The display apparatus 700 may be formed of an electrophoretic display, a liquid crystal display (LCD), or an organic light-emitting diode (OLED). The display unit 700 may be provided in the form of a touch screen so as to receive an input via a touch of a user, and thus may operate as an input interface.

Figure 2:
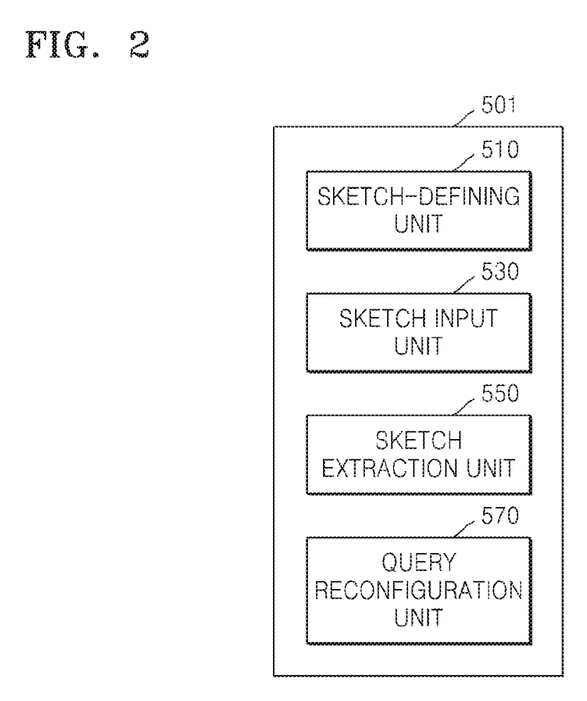
FIG. 2 is a schematic block diagram illustrating a configuration of a query engine according to an embodiment of the present invention.

FIG. 2 is a schematic block diagram illustrating a configuration of a query engine 501 according to an embodiment of the present invention.

Referring to FIG. 2, the query engine 501 may include a sketch-defining unit 510, a sketch input unit 530, a sketch extraction unit 550, and a query reconfiguration unit 570.

The sketch-defining unit 510 may define a sketch query for performing a search. An action of designating a search condition for a motion of an object to be searched for by drawing a line is an intuitive action. According to an embodiment of the present invention, in order to increase the efficiency of this intuition, a sketch query framework having consistent usability and extendibility is provided. According to an embodiment of the present invention, a sketch query framework has a structure similar to a natural language. A vocabulary is described for a natural language and a natural language may be formed of a sentence in which semantics are extended by combining vocabularies. According to an embodiment of the present invention, a representative basic vocabulary is described in advance and provided to a user. Additionally, according to an embodiment of the present invention, an attribute may be provided to a basic vocabulary, and thus, a search condition that may be used as a search word may be described by extending the basic vocabulary.

The sketch-defining unit 510 may determine an intuitive and simple figure or symbol as a basic vocabulary for performing a search, and provide a description and an attribute to each vocabulary. The sketch-defining unit 510 may generate and store description-to-attribute relation information in a memory. Table 1 shown below shows an example of description-to-attribute relation information, which is provided to each vocabulary that constitutes a sketch query. A color of a sketch query may be selected arbitrarily by a user.

described as a motion in an area in which the rectangle or the polygon is located. If a rectangle or a polygon is used together with a line or an arrow, the rectangle or the polygon with the line or the arrow may be described as an interaction between objects.

A solid circle is a sketch query that is described as object classification. In other words, a solid circle indicates a category to which an object encompassed by the solid circle belongs.

A ring circle is a sketch query that is described as an attribute of an object. An attribute of a ring circle may be described according to a line inside the ring circle. For example, if vertical lines are drawn inside the ring circle, the ring circle may be described as a color of an object that is covered by the ring circle. If horizontal lines are drawn, the ring circle may be described as a shape of an object that is covered by the ring circle. If a line is not drawn inside the ring circle, the ring circle may be described as a color and shape of an object that is covered by the ring circle. An object may include a background of a query image, a moving object, or the like.

An object may be searched for, in terms of two search items: classification and a feature. Classification is a descrip-

TABLE 1

| Vocabulary | Description | Attribute |
|---|---|---|
| Arrow | Direction of an object's motion | Size<br>　Single Object (Small)<br>　Multiple Object, Crowd (Large) |
| Line | Moving line of an object | Thickness<br>　Single Object (Thin)<br>　Multiple Objects, Crowd (Thick) |
| Rectangle/Polygon | Area selection<br>　Used independently (Presence of a motion)<br>　Combined with a moving line (Interaction between objects) | |
| Solid Circle | Object Classification | |
| Ring Circle | Attribute | Lines<br>　Color (Vertical)<br>　Shape (Horizontal)<br>　Both (No Lines) |
| Free Shape | Attribute | Lines<br>　Color (Vertical)<br>　Shape (Horizontal)<br>　Both (No Lines) |
| Triangle | Identical to the Virtual Line (Line Crossing + Motion Direction) | |

An arrow is a sketch query that is described as a direction of an object motion. An attribute may be provided to an arrow according to a size of the arrow. For example, if an arrow is small, the arrow may be defined as a direction of a motion of a single object. If an arrow is big, the arrow may be defined as a direction of a motion of a plurality of objects or a group (crowd). A size of an arrow may include a size and/or thickness of the arrow.

A line is a sketch query that is described as a moving line of an object. An attribute may be provided to a line according to a thickness of the line. For example, if a line is thin, the line may be described as a moving line of a single object. If a line is thick, the line may be described as a moving line of a plurality of objects or a group.

A rectangle or a polygon is a sketch query that is described as a selection of an area in which a rectangle or a polygon is located. If a single rectangle or a single polygon is used, the single rectangle or the single polygon may be tion of an object, which provides a category such as a human, a vehicle, or an animal. A feature is an attribute of an object, and an attribute may include a size, a shape, or a color. According to an embodiment of the present invention, a description and an attribute are indicated by a type of a circle. In other words, a solid circle indicates classification information of an object, and a ring circle indicates an attribute. By using such a user interface (UI) structure, a user may select an arbitrary object on a screen, and express whether the user wants a category or an attribute of the object. Selecting of an attribute of an object is a useful function for indicating a high-level semantic feature. A high-level semantic feature has a concept in which a specific part or specific semantics is used as a feature so as to model complicated information. According to an embodiment of the present invention, an attribute of an object may be selected so as to describe a feature of a whole action or a part of an object.

A free shape is a sketch query that is described as an attribute of an object. An attribute may be described according to a line in a free shape. For example, if vertical lines are drawn in a free shape, the free shape is described as a color of an object that is covered by the free shape. If horizontal lines are drawn in a free shape, the free shape is described as a shape of an object that is covered by the free shape. If a line is not drawn in a free shape, the free shape may be described as a color and a shape of an object that is covered by the free shape. An object may include a background of a query image, a moving object, or the like.

A triangle may be described as detection of an object that crosses a bottom side of the triangle and moves toward a vertex of the triangle.

According to an embodiment of the present invention, a single search based on a single sketch query or a search based on a combination of a plurality of sketch queries may be performed by using the image search system 1.

The sketch input unit 530 may provide a sketch input tool to the display apparatus 700. A sketch input tool may provide a menu in which a query image, and simple figures and symbols that may be input to the query image are provided. Additionally, a sketch input tool may provide a menu by which a user may arbitrarily draw a figure or a symbol. A user may select an object by locating a pointer on an object and enlarging a selected area using a mouse. This may be also applied to a touchscreen.

For example, a user may insert a solid circle or a ring circle as a sketch query to the query image by using a sketch input tool. In this case, a user may adjust a size of the circle by adjusting a time for maintaining or touching a mouse, a finger, or a touch pen at a location of a target in a query image on a screen. Additionally, a user may insert a free shape to the query image as a sketch query by using a sketch input tool. In this case, the user may sketch a desired shape at a location of a target in a query image on a screen by using a mouse, a finger, or a touch pen.

When a sketch query is input to a query image, the sketch extraction unit 550 may determine a description and an attribute assigned to the sketch query, by extracting a feature of the sketch query from the query image and recognizing the sketch query based on the feature of the sketch query.

The query reconfiguration unit 570 may reconfigure a search query based on a description and an attribute of each sketch query. The query reconfiguration unit 570 may perform a logical operation on a plurality of sketch queries according to whether colors of a plurality of sketch queries are identical to each other. The query reconfiguration unit 570 may reconfigure a search query by performing an AND logical operation on sketch queries of same colors. The query sketch unit 570 may reconfigure a search query by performing an OR logical operation on sketch queries of different colors.

An AND condition is a logical conjunction in which, if all conditions are true, a result is true. An OR condition is a logical disjunction in which, if any one condition is true, a result is true. If a plurality of sketch queries are all of a same color, the search engine 503 may extract image data that satisfies all sketch queries. If a plurality of sketch queries are all of different colors, the search engine 503 may extract image data that satisfies any one of sketch queries.

Figure 3:
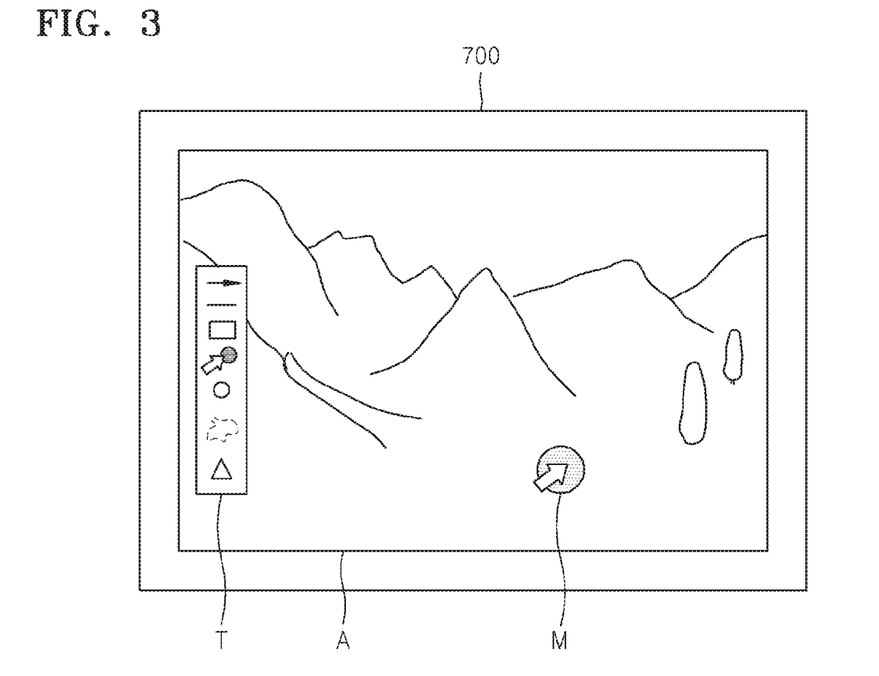
FIG. 3 is an example diagram for explaining an input of a sketch query according to an embodiment of the present invention.

FIG. 3 is an example diagram for explaining a sketch query input according to an embodiment of the present invention.

Referring to FIG. 3, the sketch input unit 530 may provide a query image A and a sketch input tool T to the display apparatus 700. The sketch input tool T may provide a menu in which a plurality of sketch query vocabularies may be selected. A user may select a sketch query to be input to the sketch input tool T by using a finger or a mouse pointer M, and then, select a location in the query image A, to which the sketch query is to be input. The user may maintain the mouse pointer M at the location in the query image A until the sketch query has a desired size in the query image A.

FIGS. 4 through 6B are diagrams illustrating an example of a sketch query according to an embodiment of the present invention.

Figure 4:
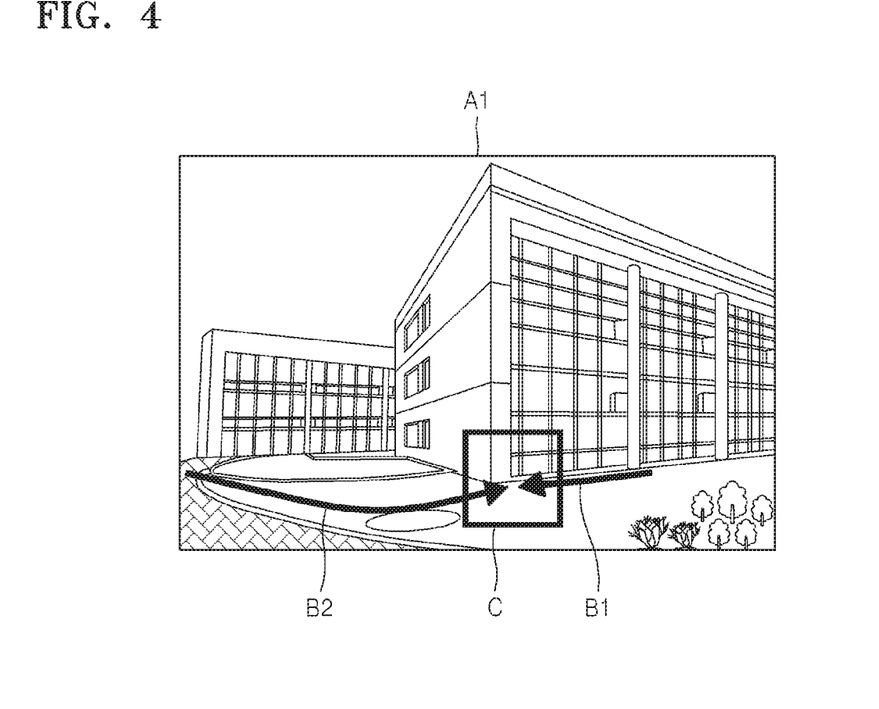

Referring to FIG. 4, three sketch queries B1, B2, and C are input to the query image A1. The sketch queries B1 and B2 are sketch queries that are expressed as small arrows. The sketch query B1 describes a direction of an object's motion from right to left, and the sketch query B2 describes a direction of an object's motion from left to right. The sketch query C is a sketch query that is expressed as a rectangle. The sketch query C describes an interaction between objects in combination of the sketch queries B1 and B2.

The query engine 501 recognizes a sketch query by extracting features of the input sketch queries B1, B2, and C. The query engine 501 grasps a description and an attribute provided to each of the recognized sketch queries B1, B2, and C, and performs a logical operation, that is, an AND operation on the sketch queries B1, B2, and C. By doing so, the query engine 501 may reconfigure a search query for requesting a search for an event in which an object in a moving line according to the sketch query B1 and another object in a moving line according to the sketch query B1 interact with each other at a location of the sketch query C.

Figure 5A:
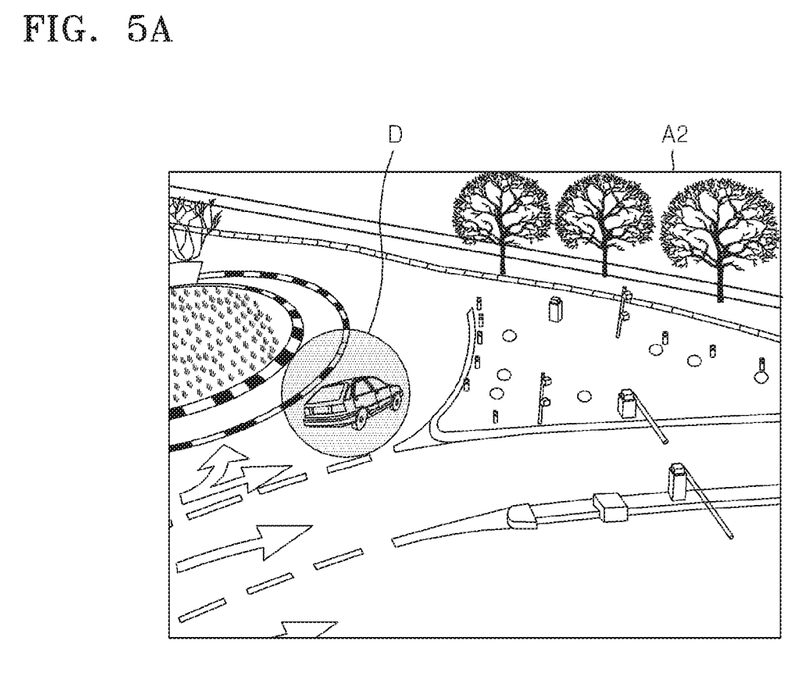

Referring to FIG. 5A, a sketch query D is input to a query image A2. The sketch query D is a sketch query that is expressed as a solid circle. The sketch query describes classification of an object that is covered by the solid circle. The object that is covered by the solid circle may be classified into a category of a vehicle.

The query engine 501 recognizes a sketch query by extracting a feature of the input sketch query D. The query engine 501 grasps a description and an attribute provided to the recognized sketch query D. In other words, the query engine 501 grasps a category into which a selected object is classified, so that the search engine 503 searches for an image in which an object in a similar category to that of the selected object appears. With regard to FIG. 5*a*, the query engine 501 may grasp a selection of a vehicle, and thus, reconfigure a search query for requesting a search for an event in which a vehicle or an object similar to a vehicle appears.

Figure 5B:
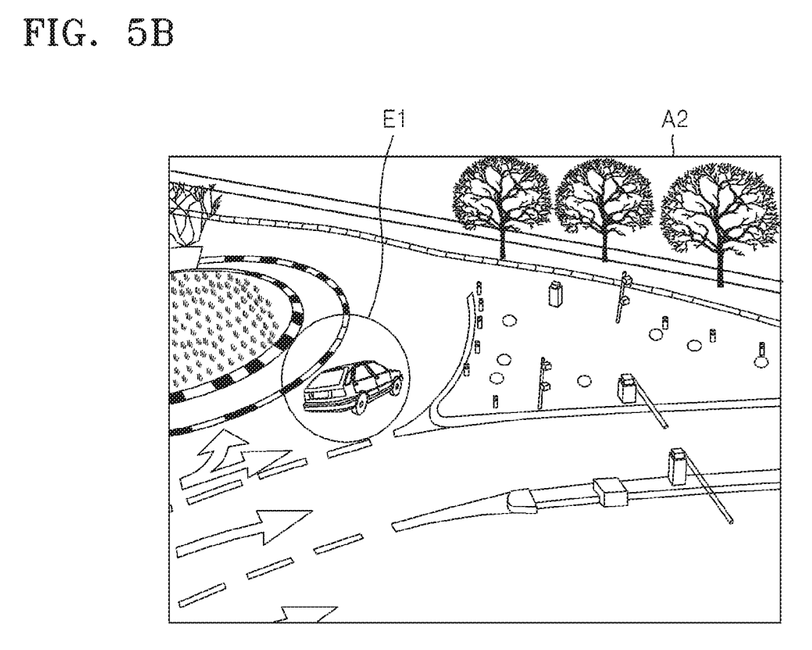

Referring to FIG. 5B, a sketch query E1 is input to the query image A2. A sketch query E is a sketch query that is expressed as a ring circle that does not have a line inside. The sketch query E describes a color and a shape of an object that is covered by the ring circle.

The query engine 501 recognizes a sketch query by extracting a feature of the input sketch query E1. The query engine 501 may grasp a description and an attribute provided to the recognized sketch query E1, and thus, reconfigure a search query for requesting a search for an event in which an object of a same color and shape as those of a vehicle appears, which is covered by the ring circle, appears. A target for the search may be limited to a vehicle, or extended to an arbitrary object other than a vehicle, which has a similar color and shape to those of a vehicle.

Figure 5C:
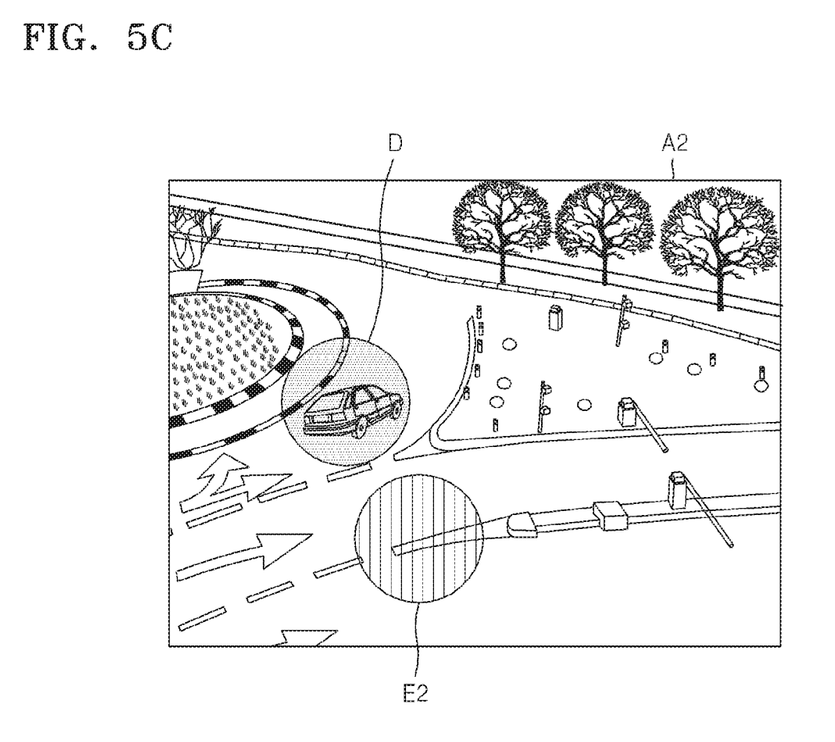

Referring to FIG. 5C, two sketch queries D and E2 are input to a query image A2. These sketch query D is a sketch query that is expressed as a solid circle. The sketch query D describes classification of an object that is covered by the solid circle. The object that is covered by the sketch query D may be classified as a vehicle. The sketch query E2 is a sketch query that is expressed as the ring circle that has a vertical line inside. The sketch query E2 describes a color of an object that is covered by the ring circle. The sketch query E2 covers a white line. The sketch queries D and E2 are sketch queries of a same color.

The query engine 501 recognizes the sketch queries D and E2 by extracting a feature of the input sketch queries D and E2. The query engine 501 grasps a description and an attribute provided to the recognized sketch queries D and E2, and performs an AND operation on the two sketch queries D and E2. By doing so, the query engine 501 may reconfigure a search query for requesting a search for an event in which vehicle or an object similar to a vehicle with white or a similar color to white appears.

Figure 6A:
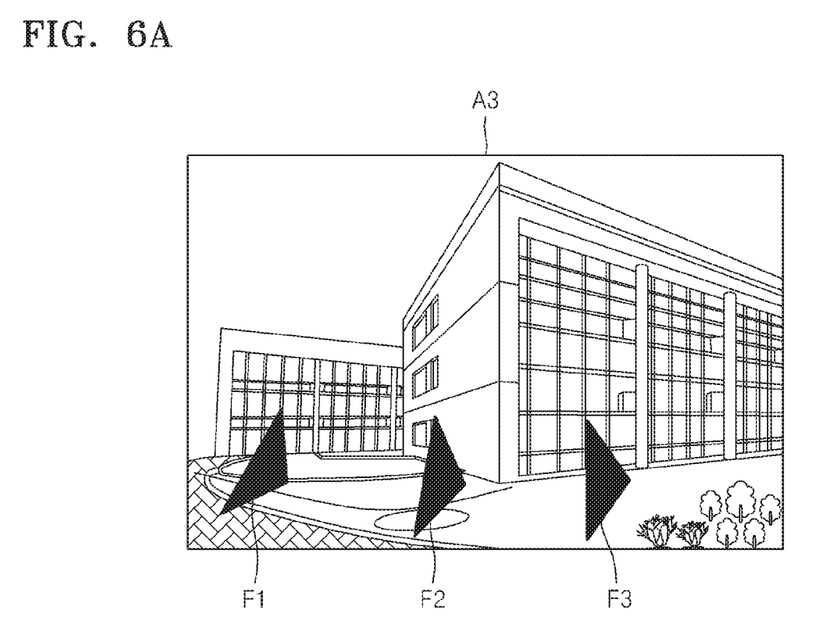

Referring to FIG. 6A, three sketch queries F1 through F3 are input to a query image A3. The sketch queries F1 through F3 are sketch queries that are expressed as a triangle. The sketch queries F1 through F3 define detection of an object that crosses a bottom side of the triangle, and moves towards a vertex of the triangle. The three sketch queries F1 through F3 are sketch queries of a same color.

The query engine 501 recognizes the sketch queries F1 through F3 by extracting features of the input sketch queries F1 through F3. The query engine 501 grasps a description and an attribute provided to the recognized sketch queries F1 through F3, and performs an AND operation on the three sketch queries F1 through F3. By doing so, the query engine 501 may reconfigure a search query for requesting a search for an event of in which an object, which has a moving line passing through all three triangles, moves.

Figure 6B:
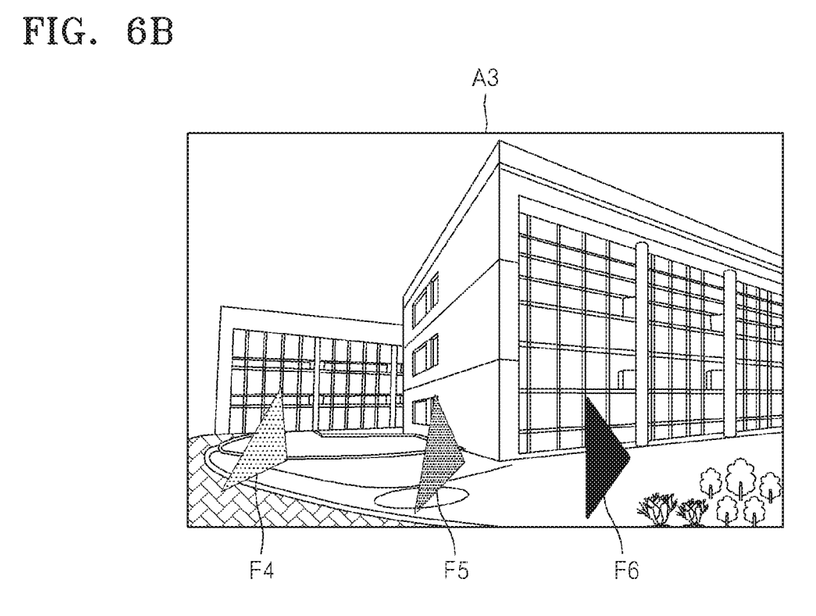

Referring to FIG. 6B, three sketch queries F1 through F3 are input to a query image A3. The sketch queries F1 through F3 are expressed as a triangle. The sketch queries F1 through F3 describe detection of an object that crosses a bottom side of the triangle and moves towards a vertex of the triangle. The three sketch queries F1 through F3 are of different colors.

The query engine 501 recognizes the sketch queries F1 through F3 by extracting features of the input sketch queries F1 through F3. The query engine 501 grasps a description and an attribute provided to the recognized sketch queries F1 through F3 and performs an OR operation on the three sketch queries F1 through F3. By doing so, the query engine 501 may reconfigure a search query for requesting a search for an event in which an object, which has a moving line passing through at least one of three triangles, moves.

Figure 7:
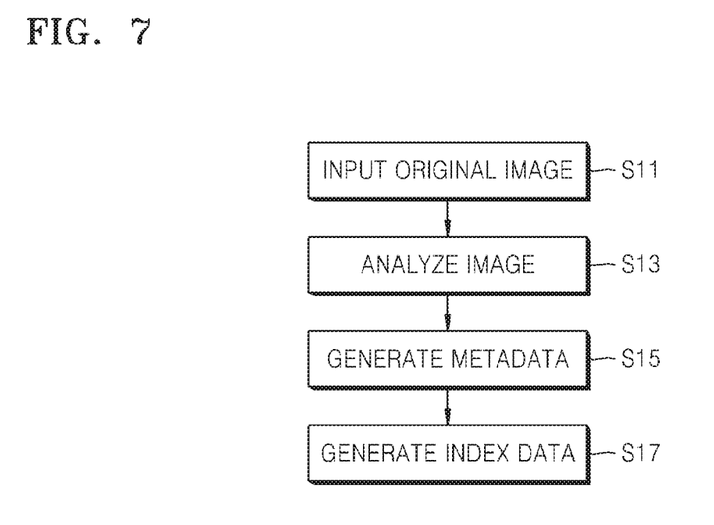
FIG. 7 is a flowchart of an image analysis method performed by the image search system, according to an embodiment of the present invention.

FIG. 7 is a flowchart of an image analysis method performed by an image search system, according to an embodiment of the present invention.

Referring to FIG. 7, if an image is input to an image search system in operation S11, the image search system analyzes an image by using a classification and analysis module in operation S13. The image search system may analyze an image according to a predefined category.

In operation S15, the image search system generates and stores metadata that is a result of the analyzing of the image. The metadata may include image-based metadata such as a blob image in a motion area or a background model as well as text-based metadata. A background model may be used as a query image.

In operation S17, the image search system generates and stores index data that is obtained by structuring and arranging metadata so that a search may be easily performed. If a sketch query is input to the image search system, the image search system may extract one or more pieces of index data, which corresponds to a search query that is obtained by reconfiguring the sketch query, and extract image data that corresponds to the index data.

Figure 8:
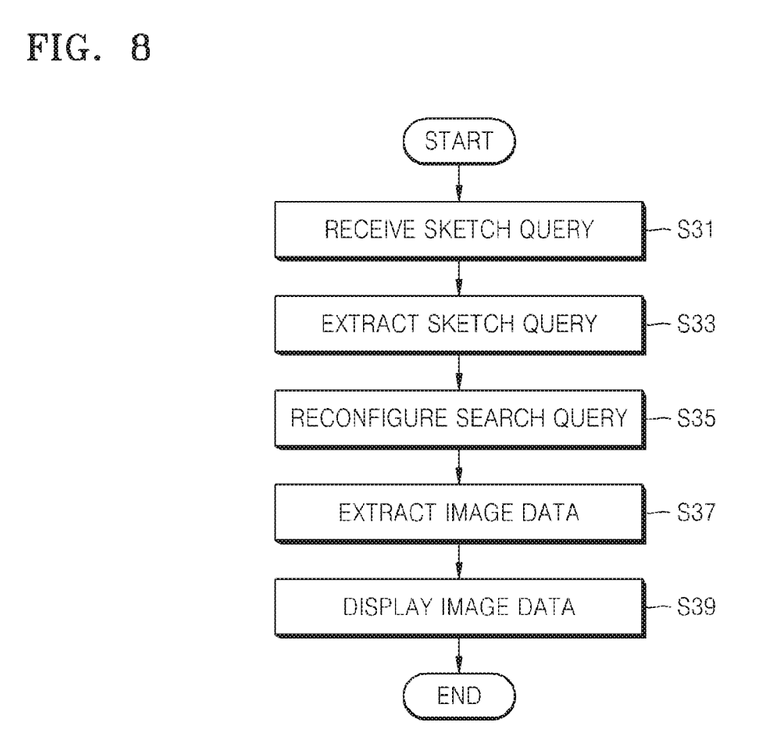
FIG. 8 is a flowchart of an image search method performed by the image search system, according to an embodiment of the present invention.

FIG. 8 is a flowchart of an image search method performed by an image search system, according to an embodiment of the present invention.

Referring to FIG. 8, if a sketch query, that is, a search condition, is input to an image search system from a user in operation S31, the image search system may extract a sketch query from a query image in operation S33.

The image search system may provide a sketch input tool for inputting a sketch query and receive a sketch query input by a user by using the sketch input tool. The image search system predefines a description-to-attribute relation of the sketch query. If a sketch query is input to the image search system, the image search system may recognize the sketch query by extracting a feature of the sketch query. The image search system may determine a description and an attribute which are provided to the sketch query based on the predefined description-to-attribute relation of the sketch query.

In operation S35, the image search system may reconfigure the search query based on the description and the attribute of the sketch query. The image search system may perform a logical operation on a plurality of sketch queries according to whether colors of the plurality of sketch queries are identical to each other. The image search system may reconfigure a search query by performing an AND operation on the sketch queries of a same color. The image search system may reconfigure a search query by performing an OR operation on the sketch queries of different colors.

In operation S37, the image search system extracts image data that matches the search query. The image search system extracts index data that matches the search query, and extracts image data that corresponds to the index data from a stored image.

Additionally, in operation S39, the image search system may provide the extracted image data. If a plurality of pieces of the extracted data exist, the image search system may provide an image data list. The image search system may arrange and provide the plurality pieces of image data according to a predefined criterion such as a time, a category, or the like. The image search system may render in real time image data selected from the image data list by a user. Additionally, the image search system may generate the plurality of image data as a summary image and provide the plurality of image data. The image search system may render a plurality of objects on a background model in an order in which the plurality of objects appear.

In the present invention, according to the image search method, a search condition having a story may be easily searched for by using a sketch that has a description-attribute relation.

In the present invention, the image search method may be applied to a search for a still image or a video clip on an internet, a video-on-demand (VOD) service to be used for broadcasting production, a monitoring system, an electronic library, or a medical field, for example, a remote medical treatment or a search for a medical image.

As described above, according to the one or more of the above embodiments of the present invention, a user may conveniently input a search condition, and grasp content based on a result of a search.

In addition, other embodiments of the present invention can also be implemented through computer readable code/instructions in/on a medium, e.g., a computer readable medium, to control at least one processing element to implement any of the above-described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An image search system in a surveillance camera system, the image search system comprising:
   one or more processors comprising:
      a query engine configured to:
         recognize a first sketch query and a second sketch query by determining a description and an attribute assigned to each of the first sketch query and the second sketch query, a first color of the first sketch query, and a second color of the second sketch query; and
         reconfigure a search query by performing a logical operation on the descriptions and the attributes of the first sketch query and the second sketch query according to a determination of whether the first color of the first sketch query is the same as the second color of the second sketch query; and
      a search engine configured to extract image data that matches the search query from a database;
   a display device configured to display the extracted image data, and
   a sketch input interface for providing an input tool via which the first sketch query and the second sketch query are input,
   wherein the query engine performs an AND logical operation on the descriptions and the attributes of the first sketch query and the second sketch query, in response to the determination that the first color of the first sketch query is the same as the second color of the second sketch query,
   wherein the query engine performs an OR logical operation on the descriptions and the attributes of the first sketch query and the second sketch query, in response to a determination that the first color of the first sketch query is different from the second color of the second sketch query, wherein the description and the attribute are assigned according to a type of a symbol representing each of the first sketch query and the second sketch query,
   wherein the descriptions of the first sketch query and the second sketch query comprise a direction of a motion of an object, a moving line of the object, a selection of an area in which each of the first sketch query and the second sketch query is located, a category of the object encompassed by each of the first sketch query and the second sketch query, and a detection of the object crossing a line,
   wherein the attributes of the first sketch query and the second sketch query comprise the object, a plurality of objects including the object, a color of the object encompassed by each of the first sketch query and the second sketch query, and a shape of the object encompassed by each of the first sketch query and the second sketch query, and
   wherein, in response to the first sketch query being selected by the input tool, a size of the first sketch query is controlled according to a time duration during which the first sketch query remains at an area in which the first sketch query is to be located in a query image, by an input means comprising a mouse, a finger or a touch pen.

2. The image search system of claim 1, wherein the first sketch query has a shape of a circle, and the query engine is configured to reconfigure the search query to refer to the category or the attribute of the object encompassed by the circle, according to a type of the circle that is selected between a solid circle type and a ring circle type.

3. The image search system of claim 1, wherein the first sketch query has a shape of a triangle, and the query engine is configured to reconfigure the first sketch query to refer to detection of the object that crosses a bottom side of the triangle and moves toward a vertex of the triangle.

4. The image search system of claim 1, wherein the first sketch query has a shape of an arrow, and the query engine is configured to reconfigure the first sketch query to refer to the direction of the motion of the object or the plurality of objects including the object, according to a size of the arrow.

5. The image search system of claim 1, the first sketch query has a shape of a line, and the query engine is configured to reconfigure the first sketch query to refer to the moving line of the object or the plurality of objects including the object, according to a thickness of the line.

6. The image search system of claim 1, wherein the first sketch query has a shape of a rectangle or a polygon, and the query engine is configured to reconfigure the first sketch query to refer to the motion of the object or an interaction between the plurality of objects including the object in an area in which the rectangle or the polygon is located.

7. The image search system of claim 1, wherein the first sketch query has an arbitrary shape, and the query engine is configured to reconfigure the first sketch query to refer to the attribute of the object encompassed by the arbitrary shape, according to a type of a line in the arbitrary shape.

8. An image search method of a surveillance camera system, the image search method comprising:
   recognizing a first sketch query and a second sketch query by determining a description and an attribute assigned to each of the first sketch query and the second sketch query, a first color of the first sketch query, and a second color of the second sketch query;
   reconfiguring a search query by performing a logical operation on the descriptions and the attributes of the first sketch query and the second sketch query according to a determination of whether the first color of the first sketch query is the same as the second color of the second sketch query;

extracting image data that matches the search query from a database;

displaying the extracted image data; and providing an input tool via which the first sketch query and the second sketch query are input, wherein the recognizing the first sketch query and the second sketch query comprises performing an AND logical operation on the descriptions and the attributes of the first sketch query and the second sketch query, in response to the determination that the first color of the first sketch query is the same as the second color of the second sketch query, and performing an OR logical operation on the descriptions and the attributes of the first sketch query and the second sketch query, in response to a determination that the first color of the first sketch query is different from the second color of the second sketch query, wherein the descriptions and the attributes of the first sketch query and the second sketch query are assigned according to a type of a symbol representing each of the first sketch query and the second sketch query, wherein the descriptions of the first sketch query and the second sketch query comprise a direction of a motion of an object, a moving line of the object, a selection of an area in which the each of first sketch query and the second sketch query is located, a category of the object encompassed by each of the first sketch query and the second sketch query, and a detection of the object crossing a line, wherein the attributes of the first sketch query and the second sketch query comprise the object, a plurality of objects including the object, a color of the object encompassed by each of the first sketch query and the second sketch query, and a shape of the object encompassed by each of the first sketch query and the second sketch query, and wherein, in response to the first sketch query being selected by the input tool, a size of the first sketch query is controlled according to a time duration during which the first sketch query remains at an area in which the first sketch query is to be located in a query image, by an input means comprising a mouse, a finger or a touch pen.

9. The image search method of claim 8, wherein the first sketch query has a shape of a circle, and the reconfiguring the search query comprises reconfiguring the first sketch query to refer to the category or the attribute of the object encompassed by the circle, according to a type of the circle selected from between a solid circle type and a ring circle type.

10. The image search method of claim 8, wherein the first sketch query has a shape of a triangle, and the reconfiguring the search query comprises reconfiguring the first sketch query to refer to detection of the object that crosses a bottom side of the triangle and moves toward a vertex of the triangle.

* * * * *